United States Patent
Ikura et al.

(10) Patent No.: US 7,107,776 B2
(45) Date of Patent: Sep. 19, 2006

(54) AIR CONDITIONING SYSTEM FOR VEHICLE

(75) Inventors: Hiroshi Ikura, Saitama (JP);
Hiromitsu Adachi, Saitama (JP);
Masamichi Kubota, Saitama (JP);
Hideki Watanabe, Saitama (JP);
Shinichirou Wakou, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/849,167

(22) Filed: May 20, 2004

(65) Prior Publication Data
US 2004/0231349 A1 Nov. 25, 2004

(30) Foreign Application Priority Data
May 21, 2003 (JP) .............................. 2003-143792

(51) Int. Cl.
*F25B 41/00* (2006.01)
(52) U.S. Cl. ........................ 62/196.2; 62/228.5; 62/236
(58) Field of Classification Search ............... 62/196.2, 62/228.5, 236, 323.3, 510; 417/3, 5, 374, 417/429
See application file for complete search history.

(56) References Cited

U.S. PATENT DOCUMENTS

| | | | | |
|---|---|---|---|---|
| 3,668,883 A | * | 6/1972 | Ruff et al. ..................... | 62/158 |
| 4,543,044 A | * | 9/1985 | Simmons ..................... | 417/342 |
| 4,934,158 A | * | 6/1990 | Sakano ......................... | 62/239 |
| 5,029,449 A | * | 7/1991 | Wilkinson .................... | 62/175 |
| 5,062,274 A | * | 11/1991 | Shaw ........................... | 62/117 |
| 5,927,088 A | * | 7/1999 | Shaw ........................... | 62/175 |
| 6,266,952 B1 | * | 7/2001 | Choroszylow et al. ........ | 60/783 |
| 6,287,081 B1 | * | 9/2001 | Tamegai et al. ............... | 417/15 |
| 6,543,243 B1 | * | 4/2003 | Mohrmann et al. ........... | 62/230 |
| 6,659,727 B1 | * | 12/2003 | Major et al. ................... | 417/16 |
| 6,755,030 B1 | * | 6/2004 | Adaniya et al. .............. | 62/115 |
| 6,796,138 B1 | * | 9/2004 | Imai et al. ..................... | 62/236 |

FOREIGN PATENT DOCUMENTS

JP 2000-179374 6/2000

* cited by examiner

*Primary Examiner*—William E. Tapolcai
(74) *Attorney, Agent, or Firm*—Arent Fox PLLC (57) ABSTRACT

An air conditioning system includes a primary or engine-driven compressor that is driven by a primary driving source or engine, and a secondary or motor-driven compressor that is driven by a secondary driving source or motor. The air conditioning system increases in advance an output of the secondary or motor-driven compressor before the primary or engine-driven compressor is stopped. Further, when a load of the secondary or motor-driven compressor becomes a predetermined value while the secondary or motor-driven compressor is in operation, the primary or engine-driven compressor is activated.

11 Claims, 6 Drawing Sheets

AIR CONDITIONING SYSTEM FOR VEHICLE

BACKGROUND OF THE INVENTION

The present invention relates to an air conditioning system for a vehicle including a primary compressor which is driven by a primary driving source including an engine and a secondary compressor driven by a secondary driving source including a motor.

Conventionally, there are known air conditioning systems for vehicle which use an engine driven compressor which uses a vehicular running engine as a driving source, an electric motor which is installed in an electric vehicle and a motor driven compressor which is used when the idling of an engine is stopped.

In recent years, there is an increasing tendency to drastically promote and improvement in fuel economy, and in conjunction with this tendency, the number of vehicles having a stop-idling function tends to increase. In a vehicle having such a stop-idling function, when the vehicle is stopped while an air conditioning system is in use, the stop-idling function operates to stop the idling of the engine, and a compressor cannot operate in association with the stop of the engine. As a result, when the outside temperature is high or the sunlight is intense, the temperature of a passenger compartment of the vehicle increases, whereby there may occur a case where occupants feel uncomfortable. On the contrary, when the outside temperature is low, the dehumidifying capability is lowered to be short, and breath expelled from the occupants increases the humidity inside the passenger compartment, causing an inconvenient condition where windows are fogged.

Then, there is proposed an air conditioning system (for example, a patent literature No. 1) in which the engine is driven temporarily according to the temperature inside the passenger compartment to activate the compressor so as to adjust the temperature inside the passenger compartment to an appropriate level, and thereafter, the idling of the engine is stopped again.

In addition, in so-called mild hybrid vehicles, an air conditioning system is used in which a compressor is driven by an electric motor after the rotational speed of an engine becomes zero.

[Patent Literature No. 1]

JP-A-2000-179374 (pages 4 to 5, and FIGS. 3 and 5)

In these related air conditioning systems, however, even if the compressor is activated, a required capability cannot be provided by the air conditioning system immediately after the activation of the system. As a result, the air conditioning is carried out only by a blower until the required capability is provided by the air conditioning system. Consequently, since the temperature within the passenger compartment increases until then, there is caused a problem that the uncomfortableness cannot be eliminated within the passenger compartment.

SUMMARY OF THE INVENTION

An object of the invention is to provide an air conditioning system for a vehicle having functions to save power and to maintain the interior of a passenger compartment comfortable without decreasing the cooling capability of the air conditioning system.

With a view to attaining the object, according to a first aspect of the invention, there is provided an air conditioning system for a vehicle including a primary compressor that is driven by a primary driving source and a secondary compressor that is driven by a secondary driving source, wherein an output of the secondary compressor is increased in advance before the primary compressor is stopped.

According to the first aspect of the invention, the air conditioning system can increases in advance the cooling capability to cool the interior of the passenger compartment, for example, by increasing in advance the output of the secondary compressor (the motor-driven compressor) that is driven by the secondary driving source (the motor) before the primary compressor (the engine-driven compressor) that is driven by the primary driving source (the engine) is stopped. Due to this, even in the event that the idling of the primary driving source (the engine) is stopped to thereby stop the primary compressor (the engine-driven compressor), the interior of the passenger compartment can be maintained at a comfortable temperature by maintaining the temperature of discharged cold air of the air conditioning system.

In addition, for example, in a vehicle having a function to temporarily stop the idling of an engine thereof, the air conditioning system can prevent the increase in temperature in the interior of the passenger compartment due to the decrease in cooling capability of the air conditioning system caused by the sole operation of the secondary compressor (the motor-driven compressor) while the idling is being stopped by increasing in advance the output of the secondary compressor (the motor-driven compressor) before the primary compressor (the engine-driven compressor) is stopped. By this construction, the interior of the passenger compartment can be maintained comfortable.

According to a second aspect of the invention, there is provided an air conditioning system for a vehicle as set forth in the first aspect of the invention, wherein in the event that the output of the secondary compressor reaches a predetermined value or greater when the primary compressor is stopped, the primary compressor is activated.

According to the second aspect of the invention, in the event that the output of the secondary compressor (the motor-driven compressor) reaches the predetermined value or greater when the primary compressor (the engine-driven compressor) is stopped, the air conditioning system can activate the primary compressor (the engine-driven compressor) so as to provide an auxiliary means to the output of the secondary compressor (the motor-driven compressor), thereby making it possible to operate the air conditioning system by the two compressors. Due to this, since the primary compressor (the engine-driven compressor) assists the secondary compressor (the motor-driven compressor) in providing an extra cooling capability before the primary compressor, the interior of the passenger compartment can be prevented from getting hot due to the increase in temperature therein because of the increase in temperature in the interior of the passenger compartment that is attributed to the decrease in output of the secondary compressor (the motor-driven compressor) which would otherwise occur when the primary compressor (the engine-driven compressor) is stopped. In addition, the interior of the passenger compartment can be prevented from getting too cold. By this construction, the interior of the passenger compartment can be maintained at a comfortable temperature.

According to a third aspect of the invention, there is provided an air conditioning system for a vehicle as set forth in the first aspect of the invention, wherein in the event that the output of the secondary compressor is the predetermined value or greater when the primary compressor is stopped, the primary compressor is stopped after an elapse of a predetermined length of time.

According to the third aspect of the invention, in the event that the output of the secondary compressor (the motor-driven compressor) is the predetermined value or greater when the primary compressor (the engine-driven compressor) is stopped, the air conditioning system can provide an auxiliary means to the output of the secondary compressor (the motor-driven compressor) for a predetermined length of time by making the primary compressor (the engine-driven compressor) operate for the predetermined length of time and then stopping the primary compressor (the engine-driven compressor) after an elapse of the predetermined length of time. Due to this, since the since the primary compressor (the engine-driven compressor) assists the secondary compressor (the motor-driven compressor) in providing an extra cooling capability before the primary compressor, the interior of the passenger compartment can be prevented from getting hot due to the increase in temperature therein because of the increase in temperature in the interior of the passenger compartment that is attributed to the decrease in output of the secondary compressor (the motor-driven compressor) which would otherwise occur when the primary compressor (the engine-driven compressor) is stopped. By this construction, the interior of the passenger compartment can be maintained at a comfortable temperature.

According to a fourth aspect of the invention, there is provided an air conditioning system for a vehicle including a primary compressor that is driven by a primary driving source and a secondary compressor that is driven by a secondary driving source, wherein when a load of the secondary compressor becomes a predetermined value while the secondary compressor is in operation, the primary compressor is activated.

According to the fourth aspect of the invention, when the load of the secondary compressor (the motor-driven compressor) has become a predetermined value while the secondary compressor is in operation, the air conditioning system activates the primary compressor (the engine-driven compressor), whereby the primary compressor (the engine-driven compressor) can provide an auxiliary means to the output of the secondary compressor (the motor-driven compressor). Due to this, the increase in temperature in the interior of the passenger compartment can be prevented, whereby the interior of the passenger compartment can be maintained at a comfortable temperature.

BRIEF DESCRIPTION OF THE DRAWINGS

FIGS. 4A to 4C are diagrams showing the air conditioning system according to the embodiment of the invention, in which

FIGS. 6A to 6C are diagrams showing the air conditioning system according to the embodiment of the invention, in which

DETAILED DESCRIPTION OF THE PREFERRED EMBODIMENTS

An embodiment of an air conditioning system for a vehicle according to the invention will be described in detail below by reference to the accompanying drawings.

Figure 1:
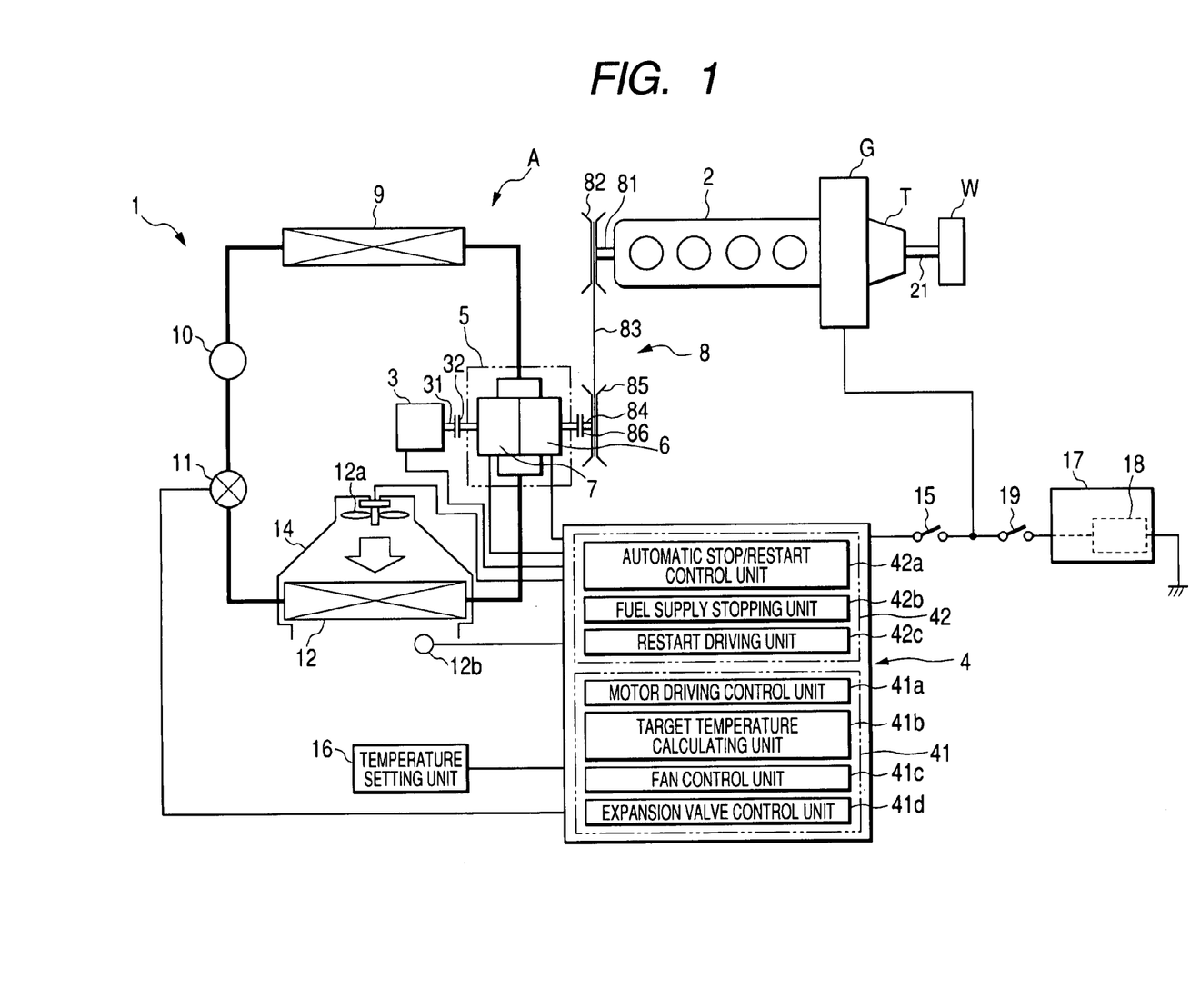
FIG. 1 is a schematic diagram showing an air conditioning system for a vehicle according to the invention.

FIG. 1 is a schematic drawing showing an air conditioning system for a vehicle according to an embodiment of the invention.

As shown in FIG. 1, the air conditioning system (hereinafter, referred simply to an "air conditioning system") is such as to operate using as driving sources an engine 2 which is a driving source of a vehicle and a motor 3 for a motor-driven compressor 7.

While the air conditioning system 1 is optimum as a system that is installed, for example, in a vehicle having a function to temporarily stop the idling of an engine thereof, the air conditioning system may be installed either in the vehicle having the stop-idling function or in a vehicle having no such stop-idling function.

Hereinafter, an embodiment of the invention will be described by taking as an example an air conditioning system 1 on a vehicle in which the stop-idling function is installed.

As shown in FIG. 1, the air conditioning system 1 includes the engine 2 and a motor/generator G, the motor 3 for the motor-driven compressor 7, a hybrid-type compressor 5 for operating a refrigeration cycle apparatus A of the air conditioning system 1 which includes, in turn, an engine-driven compressor 6 and the motor-driven compressor 7, an condenser 9, a liquid refrigerant receiver 10, an expansion valve 11, an evaporator 12 having an evaporator air temperature sensor 12b and a controller 4.

Note that the engine 2 corresponds to a "primary driving source" claimed herein, the motor 3 corresponds to a "secondary driving source" claimed herein, the engine-driven compressor 6 corresponds to a "primary compressor" claimed herein, and the motor-driven compressor 7 corresponds to a "secondary compressor" claimed herein.

Next, the respective devices will be described by reference to FIG. 1.

As shown in FIG. 1, the engine 2 is, for example, an internal combustion engine using gasoline as a fuel for running a vehicle and functions to rotate wheels W, to rotate the motor/generator G to store electrical energy in an electrical energy storage unit 17 and to drive the engine-driven compressor 6. The engine 2 and the motor/generator G are connected to each other via a rotating shaft 21 so as to form a hybrid-type driving source. A transmission device 8 is provided on the other end of the engine 2 for allowing the engine-driven compressor 6 and the engine 2 to interlock. The rotation of the engine 2 is transmitted to the wheels W via a transmission T.

The transmission device 8 is constituted by a belt transmission mechanism constructed by extending a belt 83 between a pulley 82 provided on the engine 2 and a pulley 85 provided on the engine-driven compressor 6. The transmission device 8 includes, for example, a rotating shaft 81 disposed on the other end of the engine 2 so as to be rotated by the engine 2, the pulley 82 provided at a distal end of the rotating shaft 81, the pulley 85 for driving the engine-driven compressor 6, the belt 83 for making the pulley 82 and the pulley 85 to interlock, and a driving shaft 84 provided on the engine-driven compressor 6.

The motor/generator G has a function as a starter motor for starting the engine 2 and a function to generate electricity by being rotated by the engine 2. The motor/generator G is electrically connected to the electrical energy storage unit 17 for charging a battery 18 and supplying power for respective electric equipment.

A motor 3 is a power source which is electrically connected to the battery 18 via an air conditioner switch 15 and an ignition switch 19 and is rotated by the battery 18 so as to drive the motor-driven compressor 7. The rotation of the motor 3 is designed to intermittently be transmitted to the motor-driven compressor 7 by a rotating shaft 31 having an electromagnetic clutch 32 interposed at an intermediate portion thereof.

A refrigeration cycle apparatus A is such as to form a refrigeration cycle in the air conditioning system 1. The refrigeration cycle apparatus A includes, as main constituent parts, a hybrid-type compressor 5, a condenser 9, a liquid refrigerant receiver 10, an expansion valve 11 and an evaporator 12, and these constituent parts are connected sequentially in that order with the hybrid-type compressor 15 being located at a most-upstream end and the evaporator 12 being located at a most-downstream end. The refrigeration cycle is a cycle of refrigerant including evaporation, compression, condensation and expansion, and the evaporator 12 performs evaporation, the hybrid-type compressor 5 performs compression, the condenser 9 performs condensation, and the expansion valve 12 performs expansion.

The hybrid-type compressor 5 is a device for compressing a refrigerant constituted by fluorocarbon gas (HFC134*a*) or carbon dioxide (CO$_2$) gas. The hybrid-type compressor 5 is constituted by two compressor; the engine-driven compressor 6 that uses an engine-driven method in which the compressor is driven by the engine 2 and the motor-driven compressor 7 that uses an electrically driven method the compressor is driven by the motor 3, for the sake of saving the power of the compressor. Being constituted by the two types of compressors, the hybrid-type compressor 5 operates to save the power, to provide a comfortable environment within the passenger compartment. A refrigerant compressed by the hybrid-type compressor 5 is fed with pressure to a condenser 9 via piping.

Note that the hybrid-type compressor 5 may be an integral-type compressor constituted by the engine-driven compressor 6 and the motor-driven compressor 7 or include those compressors which are made separate from each other.

The engine-driven compressor 6 includes, for example, a compressor having a relatively smaller capacity that is driven by transmitting the rotation of a rotating shaft 81 of the engine 2 by a transmission device 8.

The electromagnetic clutch 86 is placed at the intermediate location of the driving shaft 84 provided on the engine-driven compressor 6 for intermittent transmission of the rotation of the engine 2.

The motor-driven compressor 7 is an electric compressor which is connected to the motor 3 by the rotating shaft 31 via an electromagnetic clutch 32 so as to be rotated by the motor 3 which functions as an auxiliary to the engine-driven compressor 6. The motor-driven compressor 7 operates together with the engine-driven compressor 6 which is driven by the engine 2, operates when the idling of the engine 2 is being stopped or operates irrespective of the sole operation of the engine-driven compressor 6.

The motor-driven compressor 7 is controlled to be driven by a motor driving control unit 41*a* by a difference between a set temperature set by a temperature setting unit 16, a target temperature calculated by a target temperature calculating unit 41*b* based on environmental factors such as temperature, humidity, sunlight and the like, and air detection temperature detected by the evaporator air temperature sensor 12*b*.

Thus, while the rotation of the motor-driven compressor 7 is controlled by the temperature of air on a downstream side of the evaporator 12 (hereinafter, referred simply to an "outlet side of the evaporator 12") through which air cooled by the evaporator 12 flows and the target evaporator temperature (TGTAC), when the engine 2 is operating, the target temperature is designed to be raised by in the order of 2 to 3° C.

The condenser 9 is a device for cooling and liquifying the refrigerant whose pressure and temperature are raised by the hybrid-type compressor 5. The condenser 9 is connected to the liquid refrigerant receiver 10 via piping.

The liquid refrigerant receiver 10 is a device corresponding to a cylinder for temporarily storing a refrigerant that is liquified by the condenser 9. The liquid refrigerant receiver 10 is connected to the expansion valve 11 via a dryer (not shown), and water contents in the refrigerant are dehydrated by the dryer so that the resulting refrigerant is supplied to the expansion valve 11.

The expansion valve 11 is a device that is attached to an outlet/inlet of the evaporator 12 for converting the high-temperature and high-pressure liquified refrigerant into atomized gas when the refrigerant passes therethrough for injection. The expansion valve 11 is connected to the evaporator 12 via piping and is also connected to the controller 4 electrically. A throttle valve (not shown) is installed in the expansion valve 11 and is controlled by the controller 4 based on a detected value by the air temperature sensor 12*b* that is installed in the evaporator 12 so as to regulate the flow rate of the refrigerant (the cooling capability) that is injected into the evaporator 12.

The evaporator 12 is a heat exchanger for cooling air in the interior of the passenger compartment by absorbing heat from the air in the passenger compartment to cool the air by vaporizing a refrigerant, and is installed in an air conditioner case 14. A fan 12*a* is provided on the evaporator 12, and circulation is implemented by sending cooled air into the interior of the passenger compartment and drawing in air in the interior of the passenger compartment that is heated to a higher temperature by direct sunlight and outside temperature. A refrigerant in the evaporator 12 is connected to the hybrid-type compressor 5 via piping in such a manner that the refrigerant in the form of gas whose pressure is adjusted via valves (not shown) is returned to the hybrid-type compressor 5 where the refrigerant originates.

The fan 12a is a device that is placed on the outlet side of the evaporator 12 for drawing in air inside the passenger compartment to cause the air so drawn in to strike the evaporator 12 and returning the air so cooled by the evaporator 12 into the passenger compartment from defroster outlets (not shown), face outlets (not shown) and foot outlets (not shown) via various types of ducts (not shown) for circulating air inside the passenger compartment. The fan 12a is electrically connected to a fan control unit 41c of the controller 4. The rotation of the fan 12a is controlled by the fan control unit 41c, whereby the amount of air to be sent out by the fan 12a is controlled.

The air temperature sensor 12b of the evaporator 12 is a temperature detector for detecting the temperature of aid cooled by gasifying the refrigerant by the evaporator 12 and is installed in the air conditioner case 14 on an outlet side of air that flows through the evaporator 12.

The temperature setting unit 16 is designed to be used by an occupant when setting the temperature inside the passenger compartment to an appropriate level and includes a controller (a control panel) provided at a central portion on an instrument panel. The passenger compartment temperature setting unit 16 is electrically connected to the controller 4.

The controller 4 is an ECU having installed therein electric and electronic circuits and predetermined programs and includes the air conditioning control unit 41, an engine control unit 42 for controlling the engine 2, a control unit for changing over the charging and discharging of the electrical energy storage unit 17, and a control unit (not shown) for other constituent devices.

Next, an air conditioning control unit 41 will be described with reference to FIGS. 1 and 2.

Figure 2:
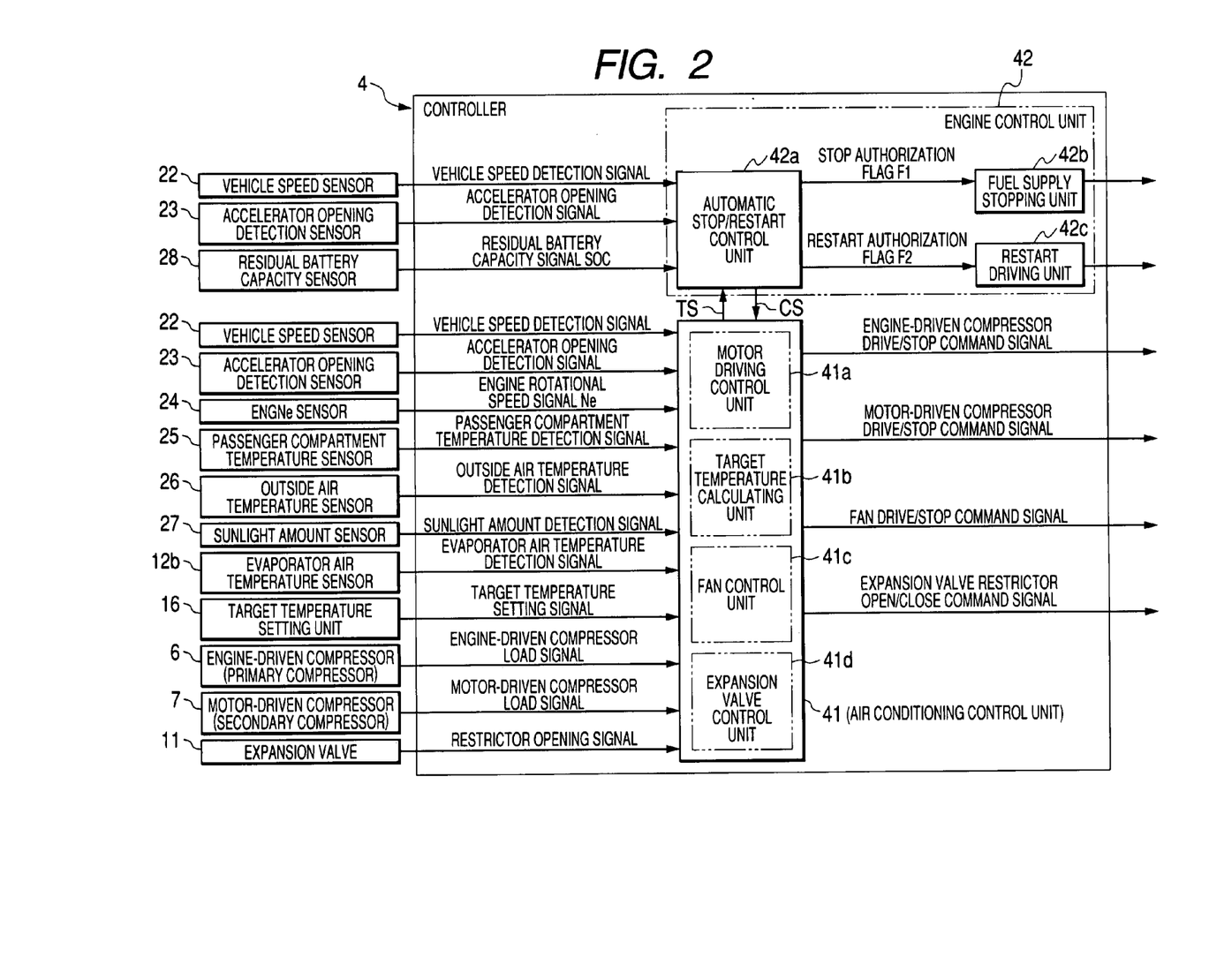
FIG. 2 is a block diagram showing the configuration of a controller that is used in an air conditioning system shown in FIG. 1.

FIG. 2 is a block diagram showing the configuration of a controller used in the air conditioning system shown in FIG. 1.

As shown in FIG. 1, the air conditioning control unit 41 controls the operation of the engine-driven compressor 6, the motor-driven compressor 7, the expansion valve 11 and the fan 12a. The air conditioning system 41 includes a motor driving control unit 41a, a target temperature calculating unit 41b, a fan control unit 41c and an expansion valve control unit 41d.

Then, the air conditioning control unit 41 has the following functions.

First of all, the air conditioning control unit 41 has a function to compare a detection temperature detected by the evaporator air temperature sensor 12b and a target temperature calculated by the target temperature calculating unit 41b and decrease the output of the motor 3 which drives the motor-driven compressor 7 when the detection temperature is lower than the target temperature.

The air conditioning system 1 also has a function to increase in advance the cooling capability by the motor-driven compressor 7 by increasing in advance the output of the motor-driven compressor 7 that is driven by the motor 3 before the engine-driven compressor 6 is stopped.

When stopping the engine-driven compressor 6, the air conditioning system 1 has a function to assist in securing a required output of the motor-driven compressor 7 by activating the engine-driven compressor 6 when the output of the motor-driven compressor 7 required needs to become equal to greater than a predetermined value.

In addition, when stopping the engine-driven compressor 6, the air conditioning system 1 has a function to assist in securing a required output of the motor-driven compressor 7 by arranging for the engine-driven compressor 6 to be stopped a predetermined length of time so as to allow the engine-driven compressor 6 to continue to operate for the predetermined length of time when the output of the motor-driven compressor 7 required needs to become equal to greater than the predetermined value.

Furthermore, the air conditioning system 1 has a function to cause the engine-driven compressor 6 to assist in securing a required output of the motor-driven compressor 7 by activating the engine-driven compressor 6 when the load of the motor-driven compressor 7 required needs to become equal to or greater than a predetermined value during the operation thereof.

As shown in FIG. 2, connected to the air conditioning control unit 41 are a vehicle speed sensor 22 for outputting a vehicle speed signal, an accelerator opening detection sensor 23 for outputting an accelerator opening detection signal, an engine rotational speed sensor (ENGNe sensor) 24 for detecting the rotational speed of the engine 2 and outputting an engine rotational speed signal Ne, a passenger compartment temperature sensor for detecting a temperature in the interior of the passenger compartment and outputting a temperature signal, an outside air temperature sensor for detecting a temperature outside the passenger compartment and outputting an outside air detection signal, a sunlight amount sensor 27 for detecting an amount of sunlight from the sun and outputting a sunlight amount detection signal, the evaporator air temperature sensor 12b for detecting the temperature of air that is cooled by the evaporator 12 and outputting an evaporator air temperature detection signal, a temperature setting unit 16 for outputting a target temperature setting signal of a set temperature in the passenger compartment that is set by an occupant as a base for a target temperature, the engine-driven compressor 6 which outputs an engine-driven compressor load signal, the motor-driven compressor 7 which outputs a motor-driven compressor load signal, and the expansion valve 11 for outputting a restrictor opening signal.

Note that the engine-driven compressor load signal and the motor-driven compressor load signal are, for example, a command value of a rotational speed.

As shown in FIG. 1, the air conditioning unit 41 is intended to operate the refrigeration cycle apparatus A and, for example only the engine 2 is driven, is configured so as to output a command signal for activating the engine-driven compressor 6. The electromagnetic clutch 86 is engaged by a drive command signal for driving the engine-driven compressor 6, whereby the engine-driven compressor 6 operates.

In addition, the air conditioning control unit 41 outputs a drive command signal for driving the motor-driven compressor 7 while the engine 2 is automatically stopped (the idling of the engine 2 is being stopped).

The air conditioning control unit 41 allow the engine 2 to continue to drive the engine-driven compressor 6 before the idling of the engine 2 is stopped and outputs a motor-driven compressor 7 drive command signal so as to allow the motor-driven compressor 7 to be operated.

Then, the air conditioning control unit 41 has a function to calculate and estimate a timing at which the motor-driven compressor 7 is activated based on a vehicle speed signal, an accelerator opening detection signal and an engine rotational speed signal Ne.

Then, when the idling of the engine 2 is stopped, the air conditioning control unit 41 outputs an engine-driven compressor 6 stop command signal or an engine-driven compressor 6 drive command signal depending on the loaded condition of the motor-driven compressor 7. When the electromagnetic clutch 86 is disengaged by the engine-driven compressor 6 stop command signal, the engine-driven compressor 6 stops and only the motor-driven compressor 7 is allowed to operate.

Then, in automatically restarting the engine 2, the air conditioning unit 41 output an engine-driven compressor 6 drive command signal at the same time that the engine 2 is driven by the motor/generator G so that the engine-driven compressor 6 can start to operate without any delay. Then, when an automatic stop/restart control unit makes the motor/generator G drive the engine 2, the air conditioning control unit 41 makes the engine-driven compressor 6 and the motor-driven compressor 7 operate together.

The motor control unit 41*a* is a controller for controlling the motor-driven compressor 7 by virtue of the rotation of the motor 3 so that the temperature in the interior of the passenger compartment coincides with a target temperature that is calculated by the target temperature calculating unit 41*b*.

The target temperature calculating unit 41*b* is such as to calculate a temperature on the outlet side of the evaporator 12 such that the temperature of the passenger compartment becomes equal to a set temperature that is set at the temperature setting unit 16 by an occupant based on predetermined disturbance conditions such as outside temperature and amount of sunlight that are preset. A value that is calculated by the target temperature calculating unit 41*b* is altered to a suitable value according to the outside temperature and amount of sunlight.

The fan control unit 41*c* is a controller for circulating cooled air from the evaporator 12 in the interior of the passenger compartment by operating the fan 12*a* and controlling the rotational speed of the fan 12*a* so that the temperature of air in the passenger compartment coincides with a temperature calculated by the target temperature calculating unit by detecting the temperature with the evaporator air temperature sensor 12*b*. Note that the fan 12*a* may be switched on and off through a manual operation.

Next, referring to FIGS. 1 and 2, the engine control unit 42 will be described.

As shown in FIG. 1, the engine control unit 42 includes the automatic stop/restart control unit 42*a* for determining whether or not the idling of the engine 2 is stopped by stopping the idling of the engine 2 or automatically restarting the engine 2, a fuel supply stopping unit 42*b* for stopping the supply of fuel to the engine 2 based on a signal from the automatic stop/restart control unit 42*a* so as to stop the idling of the engine 2 and a restart driving unit 42*c* for restarting the engine 2 which is being stopped from idling.

The automatic stop/restart control unit 42*a* is such as to stop the idling of the engine 2 by sending signals to stop the supply of fuel to the engine 2 and to implement the supply of fuel to the engine 2 to the fuel supply stopping unit 42*b* and the restart driving unit 42*c* and to mainly change over the charging and discharging of the battery 18.

As shown in FIG. 2, the automatic stop/restart control unit 42*a* is electrically connected to the vehicle speed sensor 22, the accelerator opening detection sensor 23, and a residual battery capacity sensor 28 for detecting the amount of electric energy remaining in the battery 18 (refer to FIG. 1) and outputting a residual battery capacity signal (Status of Charge) based on the amount of electric energy so detected. In addition, the fuel supply stopping unit 42*b* and the restart driving unit 42*c* are electrically connected to the automatic stop/restart control unit 42*a*.

The automatic stop/restart control unit 42*a* outputs a stop authorization flag F1 towards the fuel supply stop unit 42*b* after elapse of preset timer time after receiving from the accelerator opening detection sensor 23 an accelerator opening detection signal that informs of the closure of an accelerator on the assumption that predetermined conditions are met which will be described later on. Then, the fuel supply stopping unit 23 which has received the stop authorization flag F1 stops the supply of fuel to the engine 2 (refer to FIG. 1) to thereby stop the engine 2 (refer to FIG. 1). In addition, the automatic stop/restart control unit 42*a* outputs an engine stop signal CS towards the air conditioning control unit 41 when the engine (refer to FIG. 1) is stopped.

The predetermined conditions, that is, the conditions for stopping the idling of the engine 2 shown in FIG. 1 include at least such factors as: the vehicle speed becomes a low vehicle speed that is equal to or slower than a preset reference vehicle speed; a brake switch is switched on; the temperature of coolant in the engine 2 is equal to or higher than a predetermined value; the gearshift position of the vehicle is in a predetermined position other than R (reverse) or L (low); and the residual battery capacity is equal to or greater than a predetermined value as a result of the determination of the automatic stop/restart control unit 42*a* based on a residual battery capacity signal SOC, and these factors need to be met.

Here, that the brake switch is switched on means a condition where the brakes are applied. In addition, that the temperature of coolant in the engine 2 is equal to or higher than a predetermined value means that the coolant is at a temperature which enables the restart of the engine 2 for a low coolant temperature may disable the restart of the engine 2. "Other than R (reverse) or L (low)" means that the gearshift position is in any position other than R or L, for example, in the D (drive) range. That the residual battery capacity is equal to or greater than a predetermined value means that the residual capacity of the battery 18 detected by the residual battery capacity sensor 28 is equal to or greater than the predetermined value, for example, equal to or greater than 25% of the capacity of the battery resulting when it is fully charged.

However, in case the following conditions are met, the automatic stop/restart control unit 42*a* does not output a stop authorization flag 1 and does not stop the engine 2. These conditions or conditions for prohibition of the stopping of the idling of the engine 2 include such factors as: the motor 3 for the motor-driven compressor 7 fails; the residual capacity of the battery 18 is less than the predetermined value; and the temperature of coolant in the engine 2 is less than the predetermined value, and the stopping of the idling of the engine 2 may be prohibited when at least one of the factors is met. Note that factors that are raised as the failure of the motor 3 include such as excessive load, excessive current and excessive voltage relative to the motor 3, decrease in voltage and welding of contacts.

In addition, the automatic stop/restart control unit 42*a* outputs a restart authorization flag F2 (refer to FIG. 2) towards the restart driving unit 42*c* at the same time that the automatic stop/restart control unit 42*a* drives the motor/generator G by a routine activated by the depression of the accelerator. Then, the restart driving unit 42*c* which has received the restart authorization flag F2 (refer to FIG. 2) implements the supply of fuel to the engine 2 and ignites the fuel so supplied, whereby the engine 2 is restarted.

The air conditioning system according to the embodiment of the invention that is constructed as is described heretofore controls such that the temperature of the passenger compartment is maintained at a predetermined temperature set by the temperature setting unit 16 while the engine-driven compressor 6 and the motor-driven compressor 7 help each other reduce their loads through the control of the engine-driven compressor 6 and the motor-driven compressor 7 by the controller 4.

Next, referring to FIGS. 3 to 6, the operation of the air conditioning system 1 according to the embodiment of the invention will be described.

Figure 3:
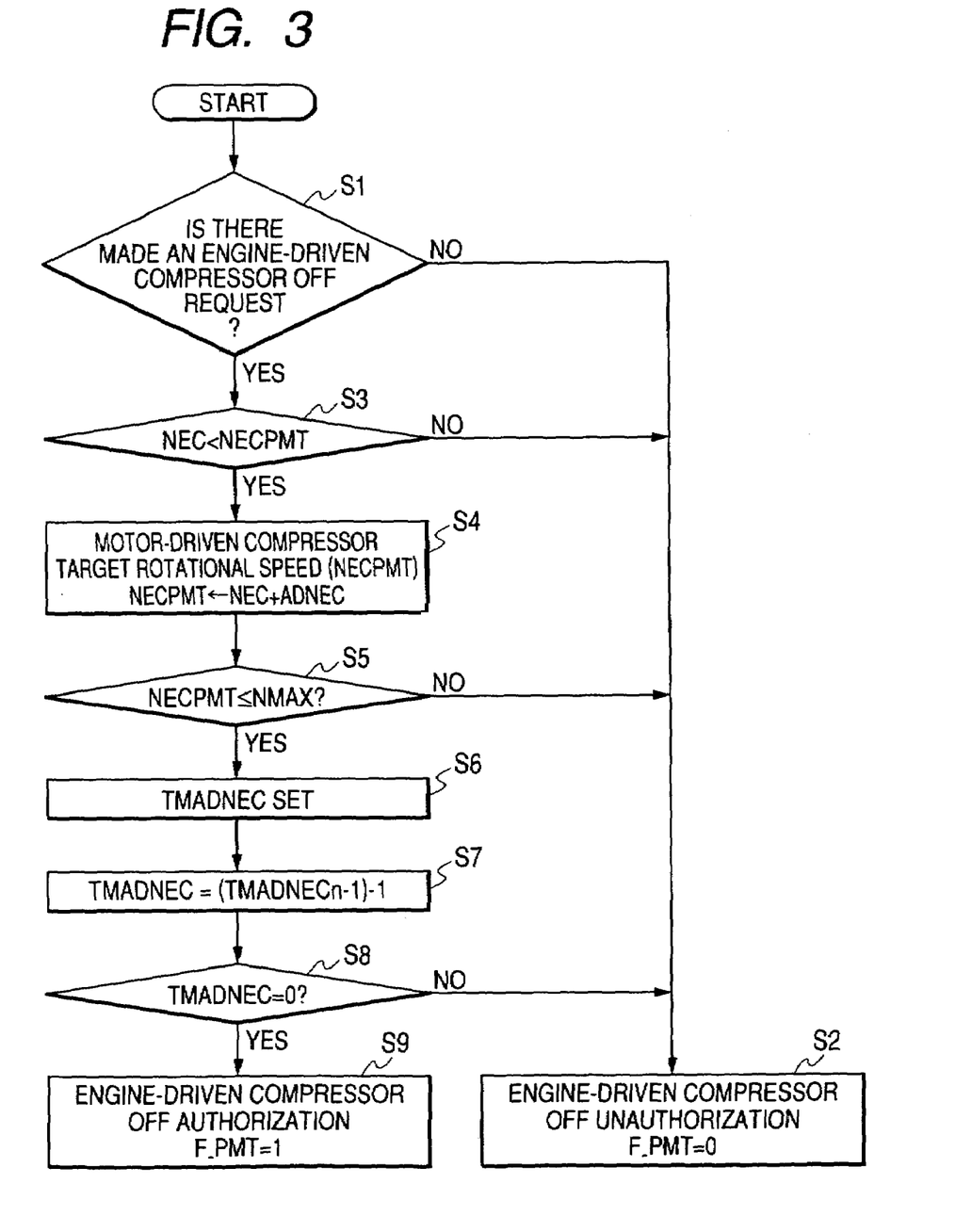
FIG. 3 is a drawing showing the air conditioning system according to the embodiment of the invention, and a flowchart of an authorization control when the engine-driven compressor is automatically stopped.

FIG. 3 is a drawing showing the air conditioning system according to the embodiment of the invention and is a flowchart of an authorization control for automatically stopping the engine-driven compressor.

First of all, an authorization control for automatically stopping the engine-driven compressor will be described by reference mainly to the flowchart in FIG. 3 as well as the other drawings, respectively.

Firstly, as shown in FIG. 1, the engine 2 is started by turning the ignition switch 19. Then, the respective sensors that are provided on the engine and the other respective devices are switched on and reading information from the sensors is automatically implemented. Next, the air conditioner switch 15 is switched on so as to activate the air conditioning system 1. When the air conditioner switch 15 is switched on, the two compressors of the hybrid-type compressor 5, that is, the engine-driven compressor 6 and the motor-driven compressor 7 are activated. The hybrid-type compressor 5 compresses and pressurizes refrigerant to thereby activate the refrigeration cycle apparatus A, whereby a refrigeration cycle is implemented which includes evaporation, compression, condensation and expansion which constitute a refrigeration cycle. When the air conditioning system 1 is activated, the output of the engine 2 is consumed by such an extent that the engine-driven compressor 6 is driven, and therefore, the power of the engine is so decreased. However, by driving the hybrid-type compressor 5 by the engine-driven compressor 6 and the motor-driven compressor 7, a decrease in power of the engine-driven compressor 6 is prevented.

Then, in step S1, as shown in FIG. 2, a fuel supply stopping unit 42b monitors at all times whether or not a request to stop the engine-driven compressor 6 is sent thereto from the air conditioning control unit 41, the vehicle speed sensor 22, the accelerator opening detection sensor 23 and the like in order to reduce the load of the engine 2 (refer to FIG. 1).

If there is no request to switch off the engine-driven compressor (No), the flow proceeds to step S2, and the operation is allowed to continue without authorizing the stop of the engine-driven compressor 6.

Then, if there is a request to switch off the engine-driven compressor (Yes), the flow proceeds to step S3.

In step S3, the current target rotational speed (NEC) of the motor-driven compressor 7 is compared with a target rotational speed (NECPMT) of the motor-driven compressor 7 which takes into account a load when the engine-driven compressor 6 is stopped, and whether or not the target rotational speed (NEC) is lower than the target rotational speed (NECPMT) is determined.

Then, if NEC<NECPMT is not true (No), that is, if the current target rotational speed (NEC) of the motor-driven compressor 7 is equal to or higher than the target rotational speed (NECPMT) of the motor-driven compressor 7 when the engine-driven compressor 6 is stopped, the flow proceeds to step S2, where no authorization to stop the engine-driven compressor 6 is granted based on the understanding that a load is being applied to the motor-driven compressor 7. By this construction, the decrease in the cooling capability of the air conditioning system 1 is prevented by the assistance given to the motor-driven compressor 7 by the engine-driven compressor 6.

On the contrary, if NEC<NECPMT is true (Yes), that is, if the current target rotational speed (NEC) of the motor-driven compressor 7 is lower than the target rotational speed (NECPMT) of the motor-driven compressor 7 when the engine-driven compressor 6 is stopped, the flow proceeds to step S4.

In step S4, a rotational speed resulting from adding a predetermined additional rotational speed (ADNEC) to the current target rotational speed (NEC) of the motor-driven compressor 7 is made to be the target rotational speed (NECPMT) of the motor-driven compressor 7 when the engine-driven compressor 6 is stopped.

Next, proceeding to step S5, the target rotational speed (NECPMT) of the motor-driven compressor 7 is compared with a predetermined value (NMAX), and whether or not the target rotational speed (NECPMT) is equal to or smaller than the predetermined value (NECPMT) is determined.

Then, if NECPMT≦NMAX is not true (No), that is, the target rotational speed (NECPMT) of the motor-driven compressor 7 exceeds the predetermined value (NMAX), the flow proceeds to step S2, where no authorization to stop the engine-driven compressor 6 is granted so as to allow the engine-driven compressor 6 to share the load of the motor-driven compressor 7 based on the understanding that the motor-driven compressor 7 is at its full capacity to implement cooling.

On the contrary, if NECPMT≦NMAX is true (Yes), that is, if the target rotational speed (NECPMT) of the motor-driven compressor 7 is equal to or smaller than the predetermined value (NMAX) that is set in advance, the flow proceeds to step S6, where a timer is set to a predetermined length of time (TMADNEC).

Note that the predetermined value (NMAX) corresponds to a "predetermined value for the secondary compressor" claimed herein.

Next, proceeding to step S7, the timer is made to operate the predetermined length of time (TMADNEC). The motor-driven compressor 7 continues to operate while the timer is so operating.

Next, proceeding to step S8, whether or not the timer (not shown) has reached 0 and the predetermined length of time (TMADNEC) has elapsed is determined.

Then, if TMADNEC=0 is not true (No), that is, if the predetermined length of time (TMADNEC) has not elapsed yet, then, the flow proceeds to step S2, where no authorization to stop the engine-driven compressor 6 is granted, and the engine-driven compressor 6 is made to continue to operate.

In contrast, if TMADNEC=0 is true (Yes), this means that the predetermined length of time has elapsed, and therefore, the flow proceeds to step S9.

In step S9, the stopping of the engine-driven compressor 6 is authorized, and hence the air conditioning system 1 is operated only by the motor-driven compressor 7. Due to this, the load of the engine 2 in operation that is to be spent by the engine-driven compressor 6 is released for the engine-driven compressor 6 is now being stopped. Then, before being stopped, the engine-driven compressor 6 is made to continue to operate the predetermined length of time (TMADPMT) by the timer (not shown) before the engine-driven compressor 6 is stopped, whereby the load of the motor-driven compressor 7 can be reduced, thereby making it possible to continue to maintain the cooling capability of the air conditioning system 1 after the engine-driven compressor 6 is stopped.

In addition, when the target rotational speed (NECPMT) of the motor-driven compressor 7 becomes equal to or larger than the predetermined value (NMAX), understanding that the load of the motor-driven compressor 7 is increased, an assistance can be imparted to the motor-driven compressor 7 by not stopping the engine-driven compressor 6 but making the same compressor to continue to operate. By this construction, the increase in temperature in the interior of the passenger compartment can be prevented.

Note that "after the elapse of predetermined length of time (TMADNEC) when the timer reaches 0" corresponds to "after an elapse of predetermined length of time" claimed herein.

Furthermore, an authorization control for automatically stopping the engine-driven compressor 6 will be described by reference to the respective drawings, in particular, to time charts shown in FIG. 4.

Figure 4A:
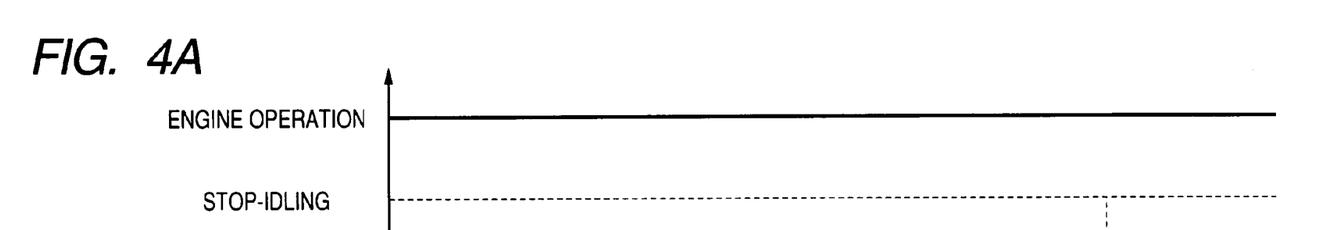
FIG. 4A is a time chart showing the operating conditions of the engine.
Figure 4B:
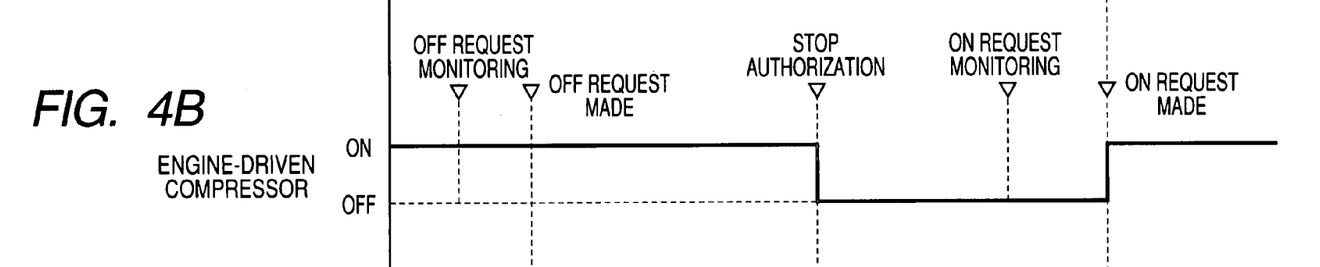
FIG. 4B is a time chart showing the operating conditions of the engine-driven compressor.
Figures 4C, 4D:
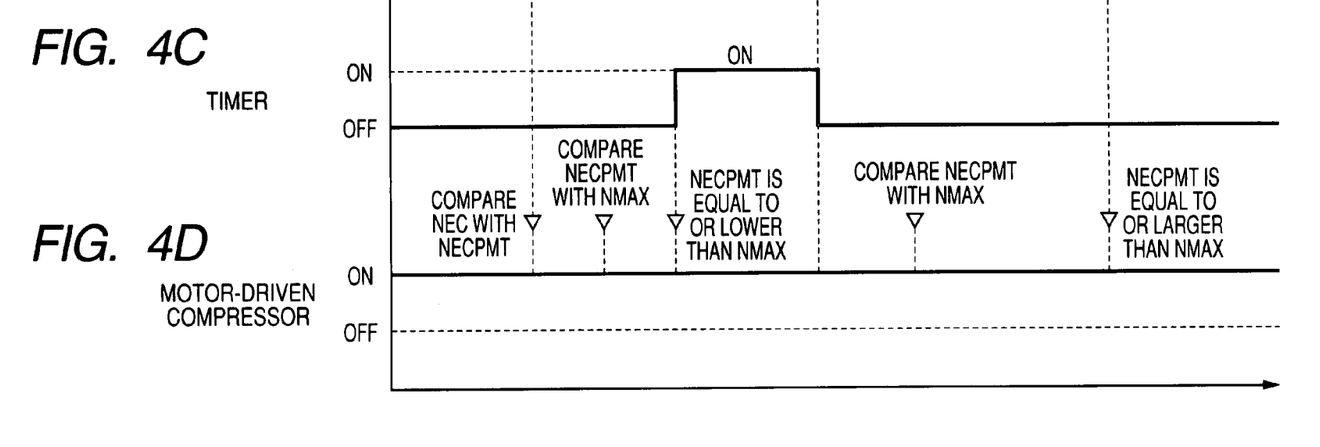
FIG. 4C is a time chart showing the operating conditions of the timer.
FIG. 4D is a time chart showing the operating conditions of the motor-driven compressor.

FIG. 4 is a diagram showing the air conditioning system according to the embodiment of the invention, in which FIG. 4A is a time chart showing the operating conditions of the engine, FIG. 4B is a time chart showing the operating conditions of the engine-driven compressor, FIG. 4C is a time chart showing the operating conditions of the timer, and FIG. 4D is a time chart showing the operating conditions of the motor-driven compressor.

As shown in FIG. 4A, the engine 2 continues to be driven with no stop of idling.

As shown in FIG. 4B, the engine-driven compressor 6 is monitored while in operation with respect to the occurrence of an OFF request to stop the engine-driven compressor 6 with a view to reducing the load of the engine 2 (refer to step S1 in FIG. 3). Then, even if there occurs an OFF request, the engine-driven compressor 6 continues to operate until an authorization for stop is granted in step S9 in FIG. 3, and then stops. The engine-driven compressor 6 is monitored while at halt with respect to the occurrence of an ON request. Then, if there occurs an ON request, the engine-driven compressor 6 is restarted.

As shown in FIG. 4C, the timer is usually switched off. The timer is set to the predetermined length of time (TMADNEC) in step S6 in FIG. 3 when the target rotational speed (NECPMT) of the motor-driven compressor 7 becomes equal to or lower than the predetermined value (NMAX) that is set in advance. The engine-driven compressor 6 continues to operate while the timer is operating even if an OFF request is made, so that an extra cooling capability is imparted to the motor-driven compressor 7. Then, when the timer reaches 0 and the predetermined length of time (TMDNEC) elapses, the stopping of the engine-driven compressor 6 in step S9 shown in FIG. 3 is authorized, and the air conditioning system 1 is operated only by the motor-driven compressor 7.

Thus, the air conditioning system 1 makes the engine-driven compressor 6 operate the predetermined length of time (TMADNEC) so as not only to reduce the load of the motor-driven compressor 7 but also to increase the cooling capability before the timer stops the engine-driven compressor 6, whereby the cooling capability can be maintained after the engine-driven compressor 6 is stopped.

As shown in FIG. 4D, the motor-driven compressor 7 remains switched on whenever the air conditioning system 1 operates. The motor-driven compressor 7 is monitored with respect to the target rotational speed (NEC), and as shown in step S3 in FIG. 3, the target rotational speed (NEC) is compared with the target rotational speed (NECPMT) of the motor-driven compressor 7 which takes into account the load resulting when the engine-driven compressor 6 is stopped.

Then, when a stop (OFF) request of the engine-driven compressor 6 is made, as shown in step S5 in FIG. 3, the target rotational speed (NECPMT) of the motor-driven compressor 7 and the predetermined value (NMAX) are compared with each other. When the target rotational speed (NECPMT) of the motor-driven compressor 7 is equal to or lower than the preset predetermined value (NMAX), the timer is set to the predetermined length of time (TMADNEC), so that the engine-driven compressor 6 is allowed to continue to operate.

When the timer reaches 0 and runs out, the engine-driven compressor 6 stops and the air conditioning system 1 is run only by the motor-driven compressor 7, and the target rotational speed (NECPMT) of the motor-driven compressor 7 is compared with the predetermined value (NMAX).

Then, when the target rotational speed (NECPMT) of the motor-driven compressor 7 reaches or exceeds the predetermined value (NMAX), understanding that the load of the motor-driven compressor 7 is increased, an ON request of the engine-driven compressor 6 is made, so that the engine-driven compressor 6 is allowed to operate to assist the motor-driven compressor 7.

Thus, the load of the engine 2 which is the driving source of the engine-driven compressor 6 is reduced not only to enhance the fuel economy but also to assist in compensating for the cooling capability that is lowered due to the sole operation of the motor-driven compressor 7 by suitably switching on and off the engine-driven compressor 6.

Next, a request control for restarting the engine-driven compressor 6 which is automatically stopped will be described by reference to the respective drawings, mainly, to a flowchart shown in FIG. 5.

Figure 5:
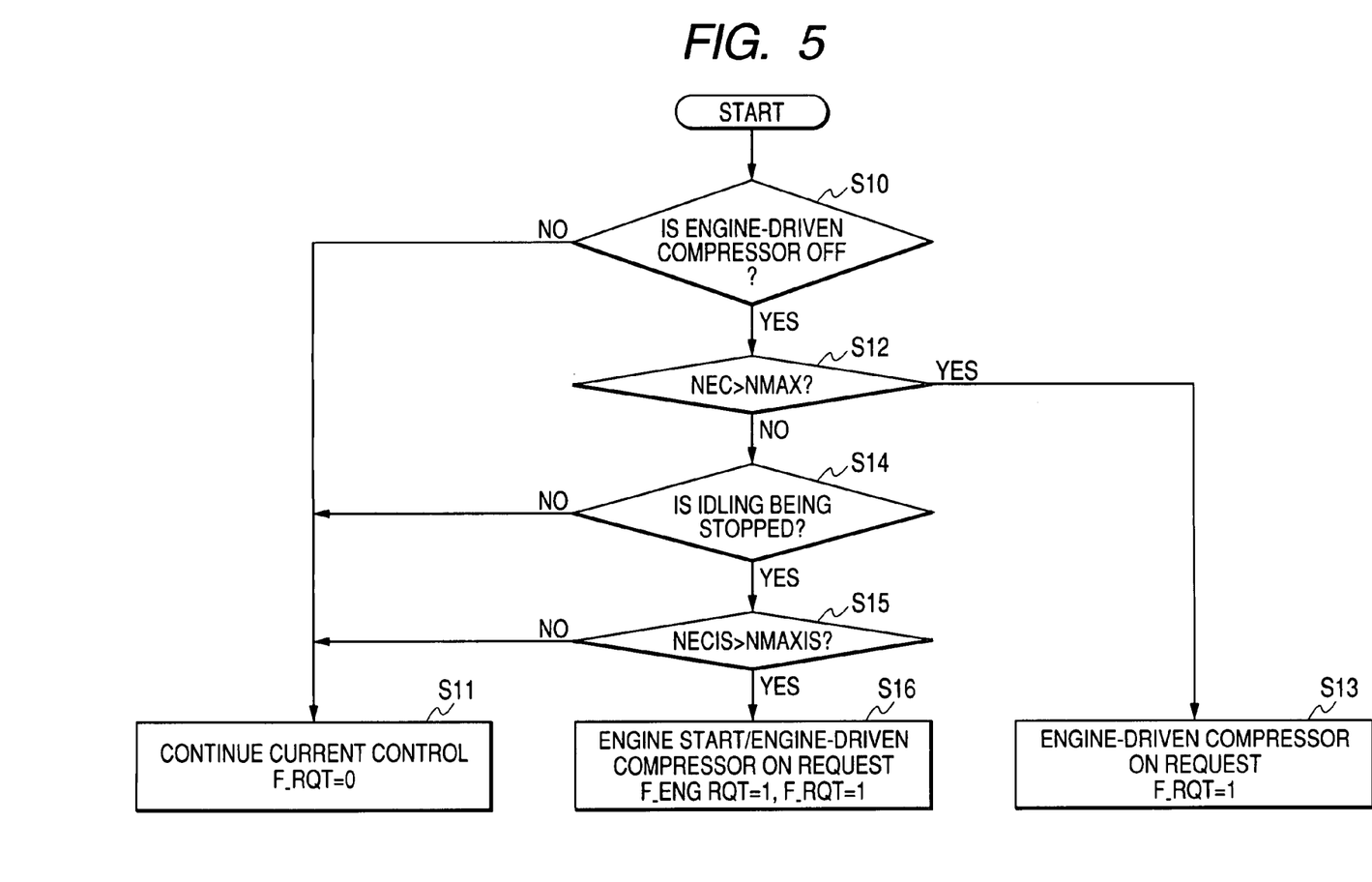
FIG. 5 is a drawing showing the air conditioning system according to the embodiment of the invention, and a flowchart of an authorization control when the engine-driven compressor is automatically stopped.

FIG. 5 is a drawing showing the air conditioning system according to the embodiment of the invention and is a flowchart of an authorization control for automatically stopping the engine-driven compressor.

First of all, in step S10, as shown in FIG. 2, whether or not the engine-driven compressor 6 is at halt is monitored and determined.

Then, if that the engine-driven compressor is OFF is not true (No), that is, if the engine-driven compressor 6 is in operation, the flow proceeds to step S11, and the normal control is made to continue where the engine-driven compressor 6 and the motor-driven compressor 7 are both made to operate.

On the contrary, that the engine-driven compressor is OFF is true (Yes), that is, if the engine-driven compressor 6 is being stopped and only the motor-driven compressor 7 is in operation, the flow proceeds to step S12.

In step S12, the current target rotational speed (NEC) of the motor-driven compressor 7 is compared with the preset predetermined value (NMAX), and whether or not the target rotational speed (NEC) exceeds the predetermined value (NMAX) is determined.

Then, if NEC>NMAX is true (Yes), that is, if the current target rotational speed (NEC) of the motor-driven compressor 7 exceeds the predetermined value (NMAX), the flow proceeds to step S13, and understanding that the load of the motor-driven compressor 7 is high, an ON request of the engine-driven compressor 6 is made so that the engine-driven compressor 6 is driven, whereby the motor-driven compressor 7 and the engine-driven compressor 6 are both driven so as to enhance the cooling capability of the air conditioning system 1, thereby making it possible to prevent the increase in temperature in the interior of the passenger compartment.

In contrast, if NEC>NMAX is not true (No), that is, the current target rotational speed (NEC) is equal to or lower than the predetermined value (NMAX), the flow proceeds to step S14.

In step S14, whether or not the idling of the engine 2 (refer to FIG. 1) is being stopped is determined by the vehicle speed sensor 22, the accelerator opening detection sensor 23 and ENGe sensor 24.

If that the idling is being stopped is not true (No), that is, if the engine 2 (refer to FIG. 1) is in operation, the flow proceeds to step S11, and the current control where both the engine-driven compressor 6 and the motor-driven compressor are in operation or the current control where the engine-driven compressor 6 is at halt, whereas the motor-driven compressor 7 is in operation is allowed to continue.

If that the idling is being stopped is true (Yes), that is, if the idling of the engine 2 (refer to FIG. 1) is being stopped, the driving of the air conditioning system 1 is made to continue by making the motor-driven compressor 7 continue to operate, thereby making it possible to maintain the interior of the passenger compartment at a comfortable temperature. Then, if the idling of the engine 2 (refer to FIG. 1) is being stopped, the flow proceeds to step S15.

In step S15, a target rotational speed (NECIS) of the motor-driven compressor 7 is compared with a preset predetermined value (NMAXIS), and whether or not the target rotational speed (NECIS) exceeds the preset predetermined value (NMAXIS) is determined.

Then, if NECIS>NMAXIS is not true (No), that is, if the target rotational speed (NECIS) of the motor-driven compressor 7 is equal to or lower than the predetermined value (NMAXIS), the flow proceeds to step S11, where the current control with the engine 2 being stopped is allowed to continue where the engine 2 is stopped, the engine-driven compressor 6 is stopped, and only the motor-driven compressor 7 is allowed to operate.

On the contrary, if NECIS>NMAXIS is true (Yes), that is, if the target rotational speed (NECIS) of the motor-driven compressor 7 exceeds the predetermined value (NMAXIS), then, the flow moves to step S16.

Note that the predetermined value (NMAXIS) corresponds to a "predetermined value for the secondary compressor" claimed herein, and the target rotational speed (NECIS) corresponds to a "load" claimed herein.

In step S16, understanding that the load of the motor-driven compressor 7 is high, a restart request of the engine 2 is made, so that the engine 2 is started, and an ON request of the engine-driven compressor 6 is made, so that the engine-driven compressor 6 is made to operate, whereby the increase in temperature in the interior of the passenger compartment is prevented, thereby making it possible to maintain a comfortable temperature condition within the interior of the passenger compartment.

Thus, while the idling is being stopped, the air conditioning system 1 can maintain the temperature in the interior of the passenger compartment to a comfortable level by making the motor-driven compressor 7 operate, and when the load of the motor-driven compressor 7 is increased, the air conditioning system 1 makes the engine-driven compressor 6 operate so as to reduce the load of the motor-driven compressor 7 to thereby prevent the decrease in cooling capability of the air conditioning system 1. Thus, the temperature in the interior of the passenger compartment can always be maintained to a comfortable level.

Furthermore, a request control for restarting the engine-driven compressor 6 which is automatically stopped will be described by reference to the respective drawings, mainly, to time charts in FIG. 6.

Figure 6A:
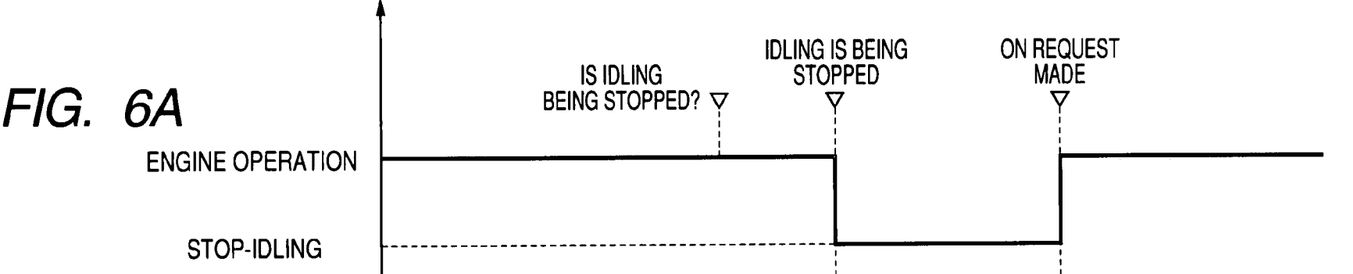
FIG. 6A is a time chart showing the conditions of the engine when the idling thereof is stopped.
Figure 6B:
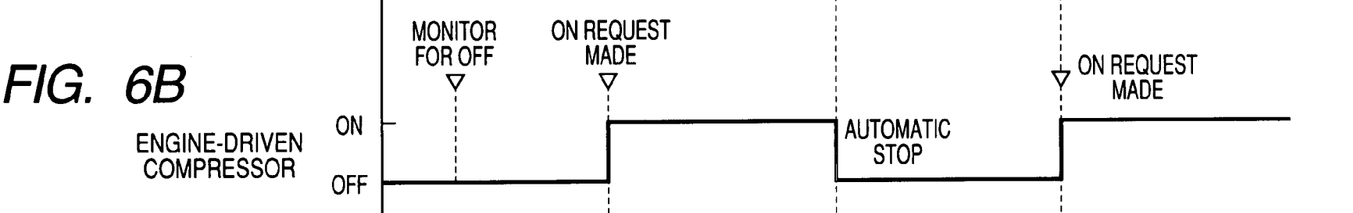
FIG. 6B is a time chart of an authorization control when the engine-driven compressor is automatically stopped.
Figure 6C:
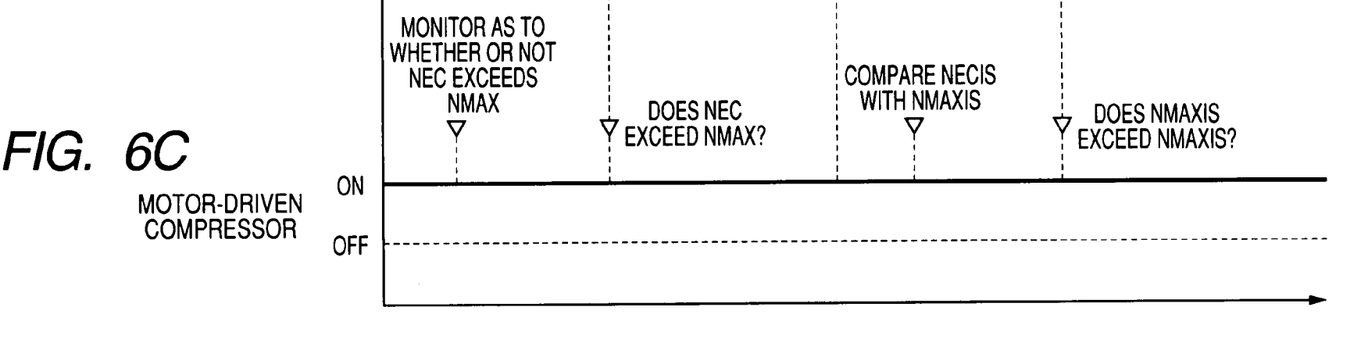
FIG. 6C is a time chart showing the operating conditions of the motor-driven compressor.

FIG. 6 is a diagram showing the air conditioning system according to the embodiment of the invention, in which FIG. 6A is a time chart showing the conditions of the engine when the idling thereof is stopped, FIG. 6B is a time chart of an authorization control when the engine-driven compressor is automatically stopped, and FIG. 6C is a time chart showing the operating conditions of the motor-driven compressor.

As shown in FIG. 6A, the engine 2 is, as shown in step S14 in FIG. 5, monitored as to whether or not the engine 2 is idling. Then, the engine 2 receives a stop-idling signal and then stops, whereas when receiving a ON request, the engine 2 restarts together with the engine-driven compressor 6.

As shown in FIG. 6B, even when the air conditioning system 1 is in operation, the engine-driven compressor 6 stops when the motor-driven compressor 7 has an extra cooling system and when the idling of the engine 2 is being stopped. The engine-driven compressor 6 is monitored as to whether or not it is off as shown in step S10 in FIG. 5. When an ON request is made as shown in step S13 in FIG. 5, the engine-driven compressor 6 starts. Then, when the idling of the engine 2 is stopped, the engine-driven compressor 6 automatically stops. The engine-driven compressor 6 is restarted by an ON request thereof made in step S16 in FIG. 5.

As shown in FIG. 6C, the motor-driven compressor 7 is on whenever the air conditioning system is in operation. Then, as shown in S12 in FIG. 15, the motor-driven compressor 7 is monitored as to whether or not the current target rotational speed (NEC) of the motor-driven compressor 7 exceeds the preset predetermined value (NMAX) when the engine-driven compressor 6 stops (OFF) and the motor-driven compressor 7 is in operation. Then, if the rotational speed (NEC) of the motor-driven compressor 7 exceeds the predetermined value (NEC), an ON request of the engine-driven compressor 6 is generated, so that the engine-driven compressor 6 is driven to assist the motor-driven compressor 7.

Then, when the idling of the engine 2 is stopped, the driving of the air conditioning system is maintained only by the motor-driven compressor 7. As shown in step S15 in FIG. 5, while the idling of the engine 2 is being stopped, the motor-driven compressor 7 is monitored as to whether or not the target rotational speed (NECIS) exceeds the preset predetermined value (NMAXIS).

When the target rotational speed (NECIS) exceeds the preset predetermined value (NMAXIS), as shown in step S16 in FIG. 5, understanding that the load of the motor-driven compressor 7 is high, an ON request is made both to the engine 2 and the engine-driven compressor 6, so that the engine 2 and the engine-driven compressor 6 are made to operate.

Thus, while the idling is being stopped, the air conditioning system 1 maintains the air temperature in the interior of the passenger compartment to a comfortable level by operating the motor-driven compressor 7, and when the load of the motor-driven compressor 7 becomes high, the air conditioning system 1 makes the engine 2 and the engine-driven compressor 6 operate, whereby the load of the motor-driven compressor 7 is alleviated, and the decrease in the cooling capability of the air conditioning system 1 is prevented, thereby making it possible to maintain the air temperature in the interior of the passenger compartment to a comfortable level.

Note that the invention is not limited to the embodiment that is described heretofore but may be modified or altered in various ways without departing from the scope of the technical concept of the invention, and needless to say, the invention is to cover all the modifications or alterations so made.

For example, the air conditioning system 1 can be applied to vehicles having no function to stop temporarily the idling of the engines thereof, provided that there are provided thereon the engine-driven compressor (the primary compressor) 6 that is driven by the engine (the primary driving source) 2 and the motor-driven compressor (the secondary compressor) 7 that is driven by the motor (the secondary driving source) 3. With the air conditioning system 1 provided on such vehicles, the motor-driven compressor (the secondary compressor) 7 is caused to operate before the engine-driven compressor (the primary compressor) 6 is stopped so as to increase the cooling capability of the air conditioning system 1. In addition, when the rotational speed of the motor-driven compressor (the secondary compressor) 7 increases, the engine (the primary driving source) 2 is started so as to cause the two compressors 6, 7 to operate together suitably, whereby not only can the temperature in the interior of the passenger compartment be maintained to a comfortable level but also the improvement in fuel economy can be attained while making exhaust emissions cleaner. In addition, with the air conditioning system 1, the two compressors 6, 7 are made to cooperate with each other so as to decrease the loads thereof, whereby the decrease in the cooling capability of the air conditioning system 1 can be prevented, and hence the temperature in the interior of the passenger compartment can be maintained at a comfortable level.

As is described heretofore, according to the first aspect of the invention, the air conditioning system can increases in advance the cooling capability to cool the interior of the passenger compartment, for example, by increasing in advance the output of the secondary compressor (the motor-driven compressor) that is driven by the secondary driving source (the motor) before the primary compressor (the engine-driven compressor) that is driven by the primary driving source (the engine) is stopped. Due to this, even in the event that the idling of the primary driving source (the engine) is stopped to thereby stop the primary compressor (the engine-driven compressor), the interior of the passenger compartment can be maintained at a comfortable temperature by maintaining the temperature of discharged cold air of the air conditioning system.

In addition, for example, in a vehicle having a function to temporarily stop the idling of an engine thereof, the air conditioning system can prevent the increase in temperature in the interior of the passenger compartment due to the decrease in cooling capability of the air conditioning system caused by the sole operation of the secondary compressor (the motor-driven compressor) while the idling is being stopped by increasing in advance the output of the secondary compressor (the motor-driven compressor) before the primary compressor (the engine-driven compressor) is stopped. By this construction, the interior of the passenger compartment can be maintained comfortable.

According to the second aspect of the invention, in the event, for example, that the output of the secondary compressor (the motor-driven compressor) reaches the predetermined value or greater when the primary compressor (the engine-driven compressor) is stopped, the air conditioning system can activate the primary compressor (the engine-driven compressor) so as to provide an auxiliary means to the output of the secondary compressor (the motor-driven compressor), thereby making it possible to operate the air conditioning system by the two compressors. Due to this, since the primary compressor (the engine-driven compressor) assists the secondary compressor (the motor-driven compressor) in providing an extra cooling capability before the primary compressor, the interior of the passenger compartment can be prevented from getting hot due to the increase in temperature therein because of the increase in temperature in the interior of the passenger compartment that is attributed to the decrease in output of the secondary compressor (the motor-driven compressor) which would otherwise occur when the primary compressor (the engine-driven compressor) is stopped. In addition, the interior of the passenger compartment can be prevented from getting too cold. By this construction, the interior of the passenger compartment can be maintained at a comfortable temperature.

According to the third aspect of the invention, in the event that the output of the secondary compressor (the motor-driven compressor) is the predetermined value or greater when the primary compressor (the engine-driven compressor) is stopped, the air conditioning system can provide an auxiliary means to the output of the secondary compressor (the motor-driven compressor) for a predetermined length of time by making the primary compressor (the engine-driven compressor) operate for the predetermined length of time and then stopping the primary compressor (the engine-driven compressor) after an elapse of the predetermined length of time. Due to this, since the since the primary compressor (the engine-driven compressor) assists the secondary compressor (the motor-driven compressor) in providing an extra cooling capability before the primary compressor, the interior of the passenger compartment can be prevented from getting hot due to the increase in temperature therein because of the increase in temperature in the interior of the passenger compartment that is attributed to the decrease in output of the secondary compressor (the motor-driven compressor) which would otherwise occur when the primary compressor (the engine-driven compressor) is stopped. By this construction, the interior of the passenger compartment can be maintained at a comfortable temperature.

According to the fourth aspect of the invention, when the load of the secondary compressor (the motor-driven compressor) has become a predetermined value while the secondary compressor is in operation, the air conditioning system activates the primary compressor (the engine-driven compressor), whereby the primary compressor (the engine-driven compressor) can provide an auxiliary means to the output of the secondary compressor (the motor-driven compressor). Due to this, the increase in temperature in the interior of the passenger compartment can be prevented, whereby the interior of the passenger compartment can be maintained at a comfortable temperature.

What is claimed is:

1. An air conditioning system for a vehicle comprising:
   a primary compressor that is driven by a primary driving source; and
   a secondary compressor that is driven by a secondary driving source, wherein
   an output of the secondary compressor is increased in advance before the primary compressor is stopped.

2. The air conditioning system as set forth in claim 1, wherein in the event that the output of the secondary compressor reaches a predetermined value or greater when the primary compressor is stopped, the primary compressor is activated.

3. The air conditioning system as set forth in claim 1, wherein
in the event that the output of the secondary compressor is the predetermined value or greater when the primary compressor is stopped, the primary compressor is stopped after an elapse of a predetermined length of time.

4. The air conditioning system as set forth in claim 1,
wherein when a load of the secondary compressor becomes a predetermined value while the secondary compressor is in operation, the primary compressor is activated, and an interior temperature of a passenger compartment of the vehicle is maintained at a desired temperature, and
wherein the primary compressor comprises an engine-driven compressor, the secondary compressor comprises a motor-driven compressor, the primary driving source comprises an engine, and the secondary driving source comprises a motor.

5. The air-conditioning system according to claim 4, wherein the motor is electrically connected to a battery via an air conditioner switch and an ignition switch and rotated by the battery to drive the motor-driven compressor.

6. The air conditioning system according to claim 4, wherein the engine-driven and motor-driven compressors are integrated to form a power saving hybrid compressor.

7. The air conditioning system according to claim 4, wherein the motor-driven compressor is an electric compressor connected to the motor by a rotating shaft and an electromagnetic clutch.

8. The air conditioning system according to claim 1, wherein the primary compressor comprises an engine-driven compressor, the secondary compressor comprises a motor-driven compressor, the primary driving source comprises an engine, and the secondary driving source comprises a motor.

9. The air-conditioning system according to claim 8, wherein the motor is electrically connected to a battery via an air conditioner switch and an ignition switch and rotated by the battery to drive the motor-driven compressor.

10. The air conditioning system according to claim 8, wherein the engine-driven and motor-driven compressors are integrated to form a power saving hybrid compressor.

11. The air conditioning system according to claim 8, wherein the motor-driven compressor is an electric compressor connected to the motor by a rotating shaft and an electromagnetic clutch.

* * * * *